Dec. 10, 1929.  H. L. HOY  1,739,308
CHANGE SPEED GEAR TRANSMISSION
Filed March 16, 1927  5 Sheets-Sheet 1
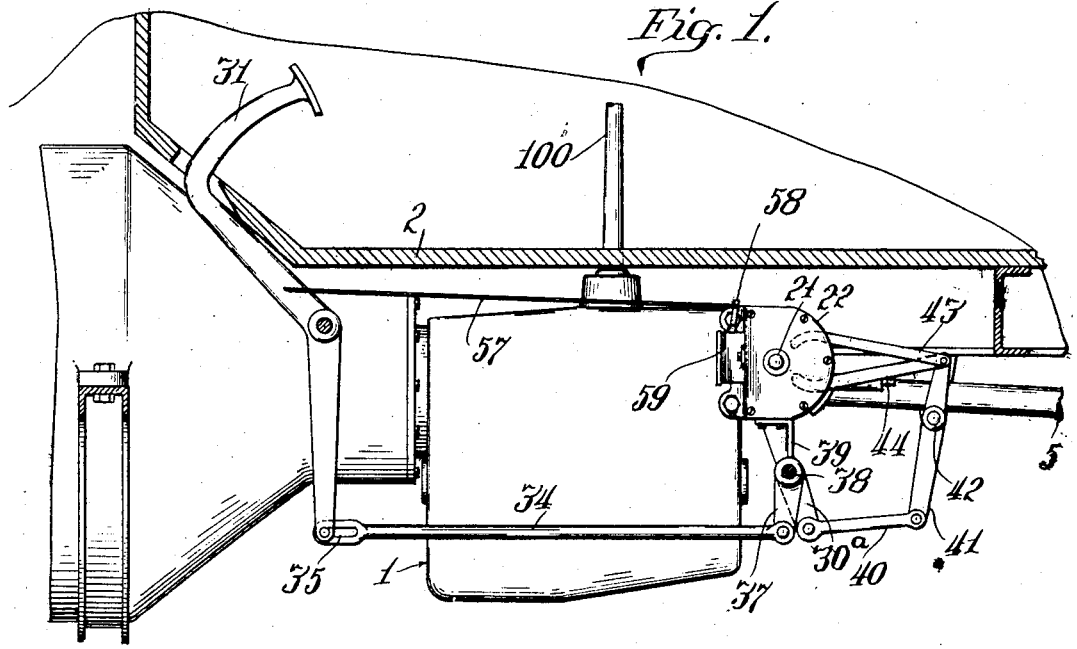
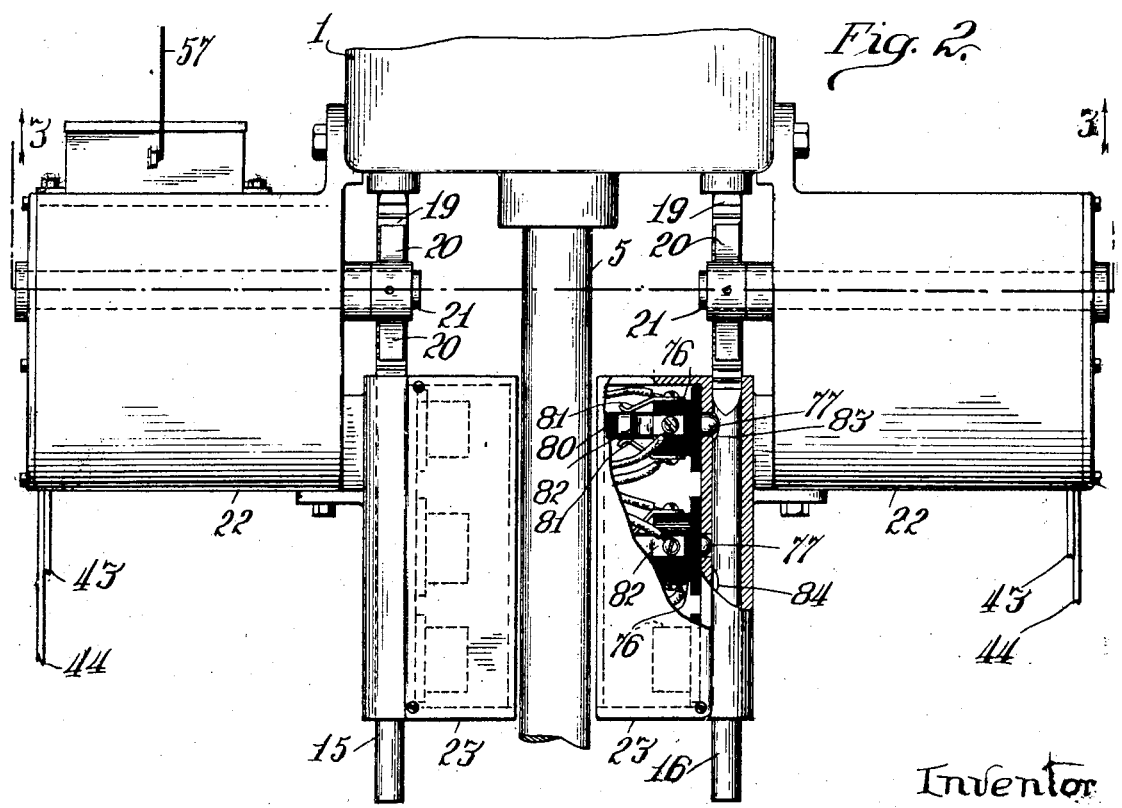
Inventor
Harry L. Hoy
By Daniel Brennan
Attorney

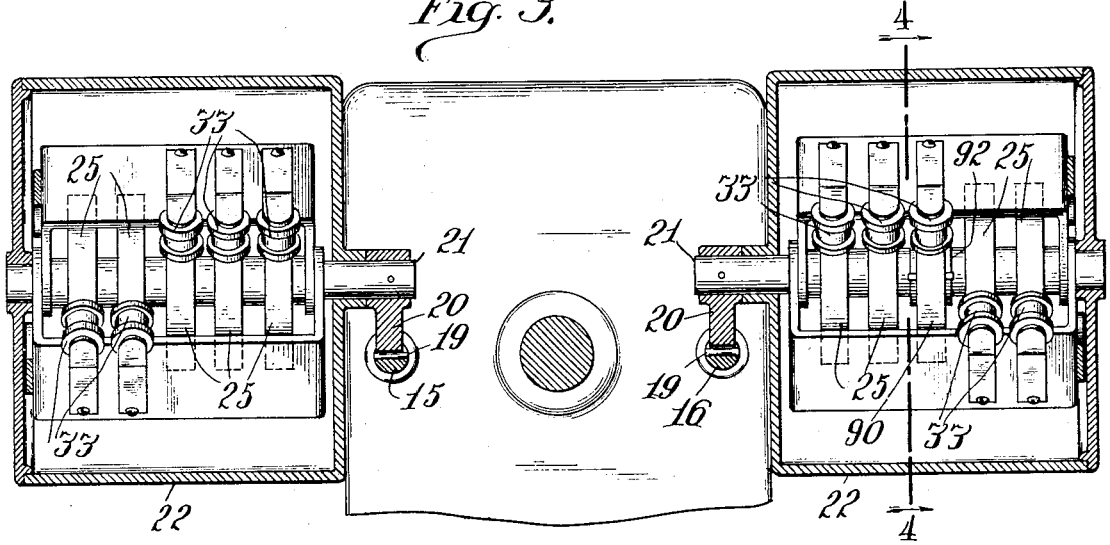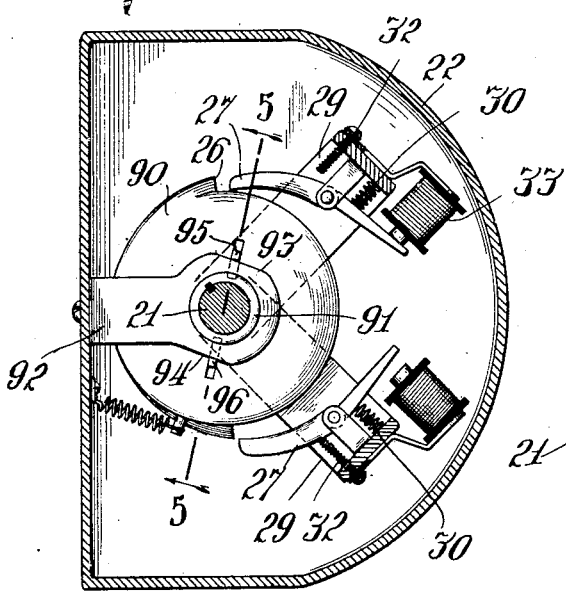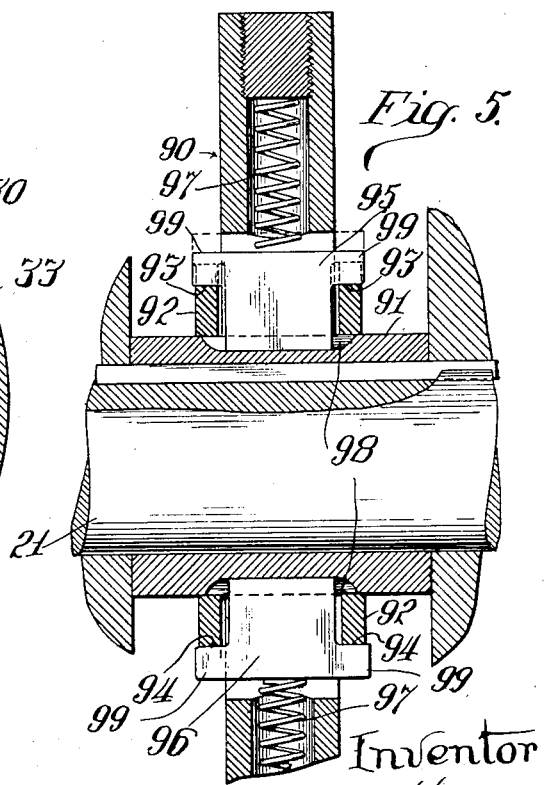

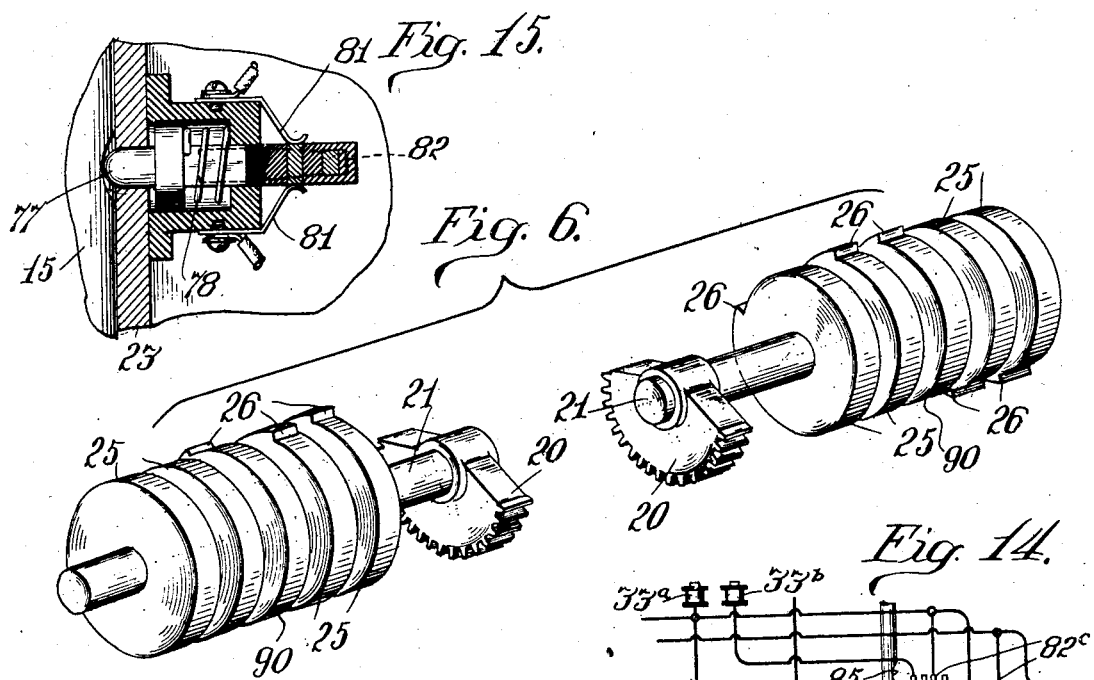
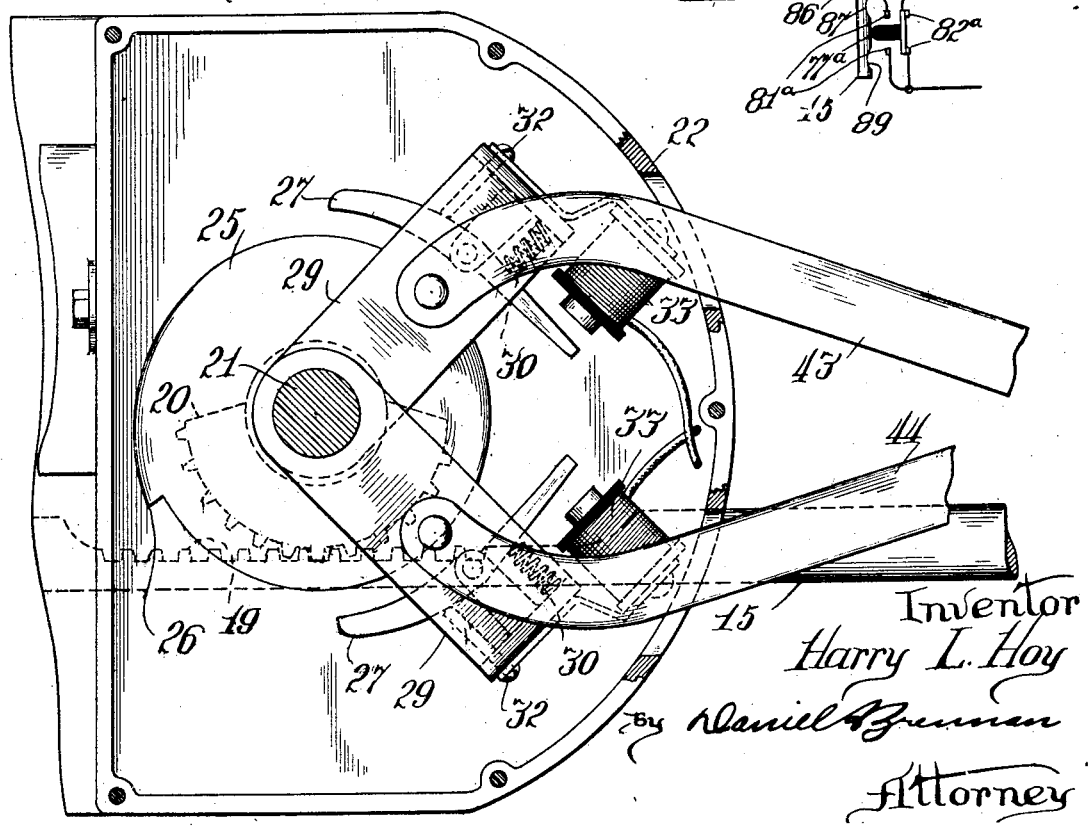

Dec. 10, 1929.  H. L. HOY  1,739,308
CHANGE SPEED GEAR TRANSMISSION
Filed March 16, 1927    5 Sheets-Sheet 4
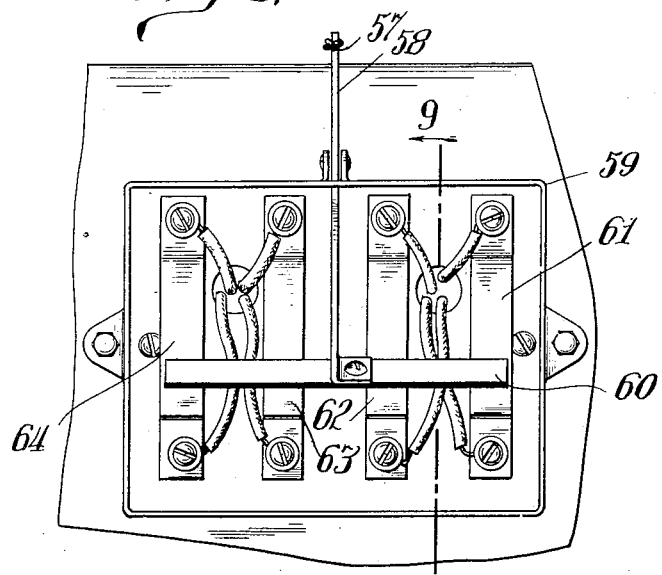
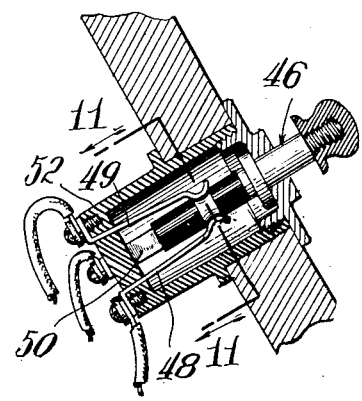
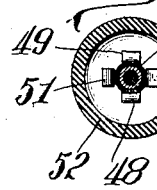
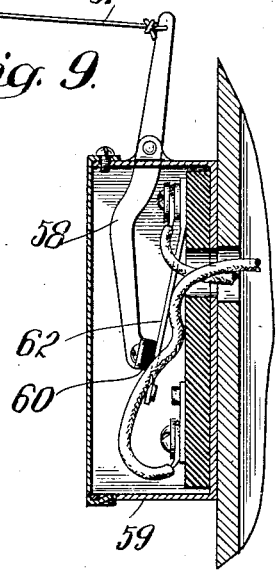
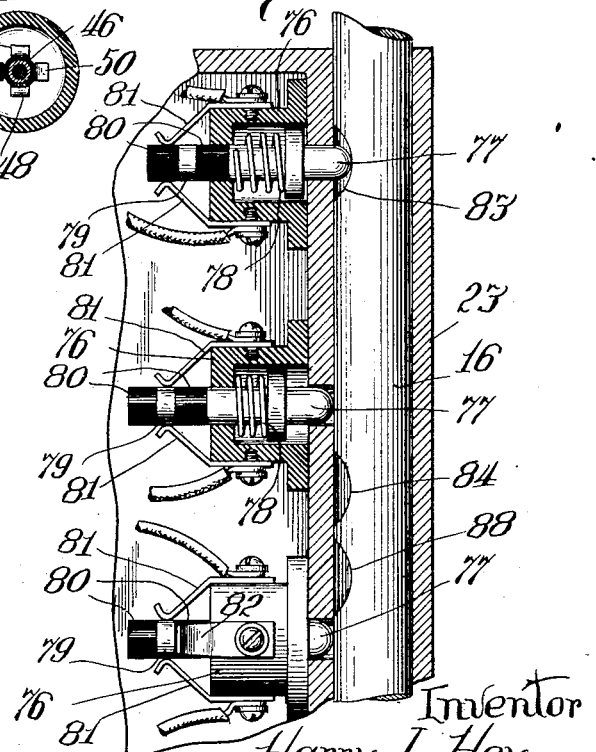
Inventor
Harry L. Hoy
By Daniel Brennan
Attorney

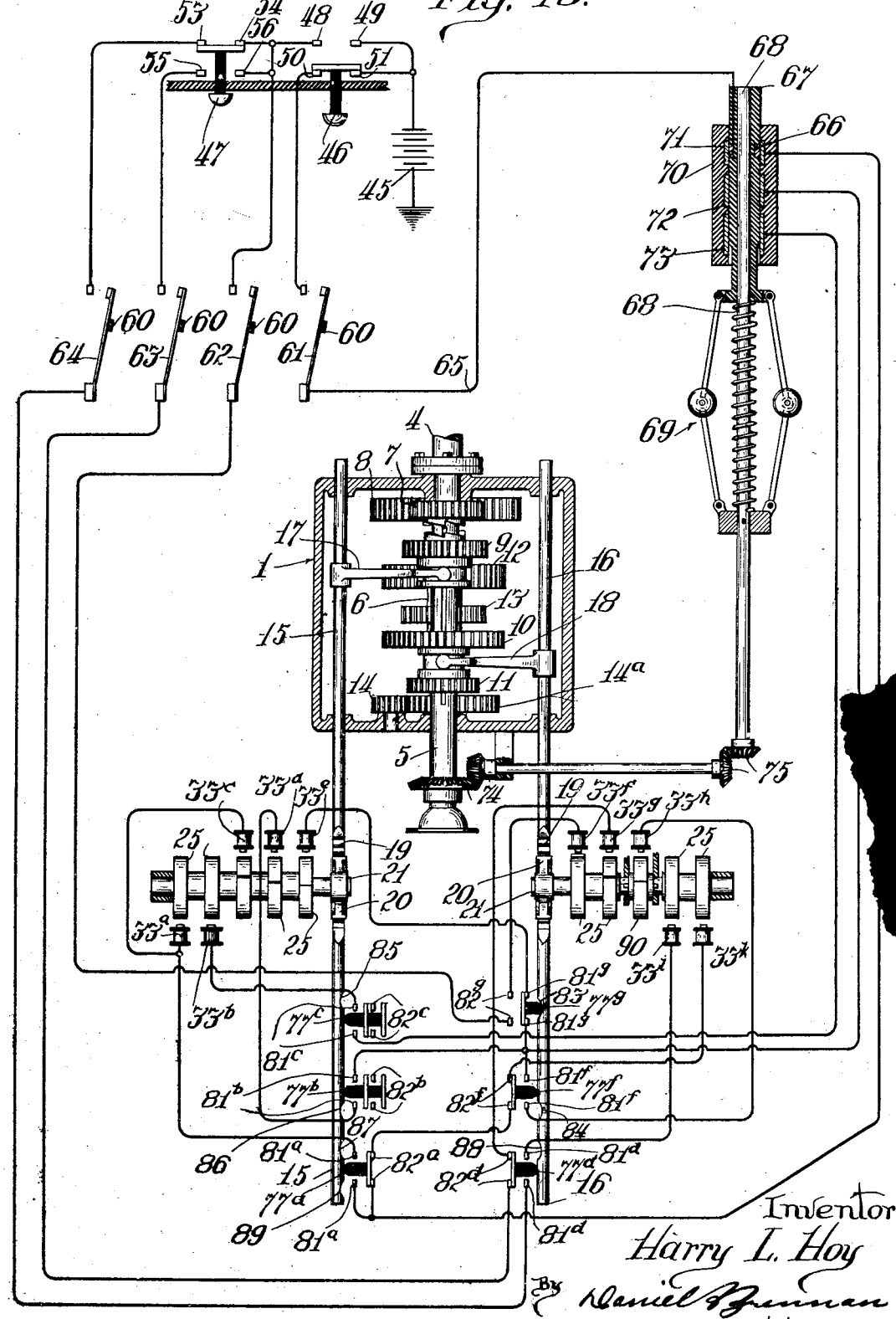

Patented Dec. 10, 1929

1,739,308

UNITED STATES PATENT OFFICE

HARRY L. HOY, OF CHICAGO, ILLINOIS

CHANGE-SPEED-GEAR TRANSMISSION

Application filed March 16, 1927. Serial No. 175,816.

The invention relates to improvements in change speed gear transmission, particularly adapted for use on automobiles, trucks and buses.

It is an object of the invention to provide a change speed gear transmission with shiftable sets of gears of the customary or any desired arrangement, adapted to assume different relations to each other and to nonshiftable gears upon variations in the speed of the driven shaft, the alteration in the relation of said shiftable gears, however, being dependent upon the actuation of a controlling element within easy reach of the operator.

It is also an object of the invention to provide a change speed gear in which the manipulation of the clutch pedal for disengaging the clutch of the vehicle, automatically effects the closure of predetermined circuits, through elements which in their turn, upon depression of the same clutch pedal, also actuate shift bars selectively, in a predetermined direction to, effect a shifting of the gears.

With these and very numerous other objects in view, an embodiment of the invention is described in the following specification and the novel features are pointed out in the appended claims, the specification making reference to the drawings, wherein:

Fig. 1 is a side elevation of the gear casing and shift levers, some parts being shown in section.

Fig. 2 is a top plan view of a portion of the casing and of other receptacles mounted thereon.

Fig. 3 is a vertical section through a pair of said receptacles on line 3—3 of Fig. 2, certain parts being shown in elevation.

Fig. 4 is a detail section on line 4—4 of Fig. 3.

Fig. 5 is a cross-section on line 5—5 of Fig. 4.

Fig. 6 is a perspective view of companion sets of shift bar discs.

Fig. 7 is a side elevation of a disc actuator detail.

Fig. 8 is a front elevation of a pedal actuated switch.

Fig. 9 is a detail section on line 9—9 of Fig. 8.

Fig. 10 is a sectional view of a typical master switch.

Fig. 11 is a section on line 11—11 of Fig. 10.

Fig. 12 is a partly sectional and partly elevational view of several switch shift bar latches.

Fig. 13 shows a wiring diagram combined with a diagrammatical assembly of the mechanical parts of the transmission.

Fig. 14 is a fragmental showing of a modified wiring diagram.

Fig. 15 is a modified form of a switch latch.

The transmission gear casing 1 is disposed below the floor board 2 in (Fig. 1) the ordinary way and receives as shown in Fig. 13, the ordinary gear transmission permitting of three gear changes forward, one reverse shift, and to neutral. The details of the change speed gear transmission, shown here in neutral, may be of ordinary construction. The engine shaft 4 is shown in alignment with the driven shaft 5, with which it may be operatively connected, either directly (high gear) or through a countershaft 6, driven from the engine shaft thru the gears 7 and 8. The shiftable gears are indicated at 9, 10 and 11, the gear 9 being movable to clutch engagement with the engine shaft 4, or to engagement with gear 12 on the countershaft 6 (second speed) while the gears 10 and 11 may be shifted simultaneously so that gear 10 will engage gear 13 on the countershaft 6 (low speed) or when shifted in the opposite direction gear 10 will drive the reverse gear 14ª through idler gear 14.

Shift bars 15 and 16, carrying shift arms 17 and 18 respectively, project from the casing and are each provided at the projecting part with a toothed or rack portion 19 each in engagement with a gear sector 20, whereby upon rotation of these gear sectors in one or the other direction displacement of the shift bars 15 and 16 is effected. The shift bars 15 and 16 are also provided on the portions extending beyond the rack 19 with suitably spaced notches, adapted for cooperation with switch members, whereby the bars are yieldingly locked in adjusted position.

The gear sectors 20—20 are each fixedly mounted on a separate transverse shaft 21—21, Fig. 3, these shafts being rotatably supported, in journals, of the housings 22—22 secured laterally of the main casing 1. The shift bars 15 and 16 extend slidably through receptacles 23 (Fig. 2) which contain the locking switch members, intended for cooperation with the notches on the shift bars.

Each of the shafts 21 carries within the interior of the pertaining housing or box 22 a plurality of cam discs 25, as shown in Figures 6 and 7, which (with the exception of one) are keyed to their shafts. The cam discs are each provided with a shoulder 26 serving as abutments for the associated actuating means, whereby upon relative movement of said actuating means with respect to the discs, the discs with their shafts 21 are rotated a predetermined step. The shoulders 26 intended for cooperation with the actuating means are not only angularly offset, but also disposed in different directions, as may be seen from Fig. 6, so that even upon uniform movement of the actuating means a non-uniform movement of the pertaining shafts 19 may be effected.

For the purpose of imparting this rotary non-uniform movement to the carrier shafts 21 of these discs, in either direction, pawls 27 are pivotally supported, one in the plane of each disc 25, on brackets 28 projecting inwardly from the transverse portion of bail shaped yokes 29 which are oscillatable about the axis of the pertaining shaft 21. Normally the rear or tail ends of the pawls 27 may be forced radially inward by springs 30, Fig. 4, in which position the pawls' nose will be free to pass the pertaining shoulder 26 of the disc to which it pertains. The spring 30 then forces the front portion of the pawl against an adjustable screw 32 which projects through the transverse member of the bail shaped yoke 29, to determine the inoperative position of the same.

The bail shaped yokes 29 also support, opposite to the tail end of each of the pawls 27, electromagnets 33 which, upon individual energization attract the tail end of the pertaining pawl against the action of the spring 30, thereby moving the nose of the pawl into a position in which, upon oscillation of the bail shaped yoke 29, the associated pawl 27 will sooner or later engage the shoulder 26 of the opposing disc, and will thereby impart, a greater or smaller, partial rotation to the carrier 21 on which the entire set of discs is mounted. Since the sectors 20 are fixedly connected with these discs, through shafts 21, it is obvious that, depending upon the extent of rotation of the respective shaft 21, a corresponding displacement of the shift bars 15 and 16 will be selectively induced, and the relationship of the gears in the casing 1 will be altered accordingly.

The actuation of the yokes 29 depend upon manipulation of an element within reach of the driver, in the present case upon operation of the clutch pedal 31 shown as projecting through the foot-board in the conventional way, and having a lost motion connection at 35 formed on a link 34, the rear end of which is pivotally secured to an arm 37 attached to a transverse shaft 38 which is rotatably supported in brackets 39 projecting downward from the housings 22. Arms 30ª fixedly attached to the shaft 38 are each connected by a link 40 to levers 41 fulcrumed intermediate its ends as at 42 in a bracket 42ª on the chassis of the vehicle. The opposite end of each lever 41 is pivotally connected with two arms 43 and 44. A set of said arms extend from each housing 22, and each arm of the set is secured at its inner end to one of the yokes 29.

It is obvious, that upon actuation of the clutch pedal 31 to an extent which will exceed the lost motion at 35, that the arms 43 and 44 will be actuated and a rocking movement will be imparted thereby to the yokes 29. Therefore, a rotary displacement of a particular disc, as for example disc 25 will occur, as its associated magnet 33 is energized. Since the shoulders 26 on certain discs are presented in different directions, and since the arms 43, and 44 will cause the two yokes 29 in each box to rock simultaneously in opposite directions, the shafts 21 will be rocked accordingly individually depending, upon which electromagnet is energized. The bars 15 and 16 will be shifted simultaneously in either direction. Release of the clutch will obviously return the yokes to their normal position through the levers and links described.

For the purpose of energizing the various electromagnets 33, the source of current 45 is connected with two selectively operable master switches 46 and 47. From Figures 10 and 11, illustrating by way of example the switch 46, it will be seen that in one terminal position of the switch two contact springs 48 and 49 are connected with each other, while two other contacts 50 and 51, also in the form of springs are separated, while in the other terminal position of the switch the contact springs 50, 51 are conductively connected, and the other contact springs are insulated from each other. The springs may be mounted on the bottom of an insulated cup or socket 52 and secured to the instrument board, or if preferred may be on the steering wheel in the form of a lever.

The other master switch 47 has contacts 53, 54 and 55, 56 in similar arrangement, Fig. 13.

By reference to Figures 1, 8 and 9, it will also be seen that the clutch pedal 31 is connected by means of a tension member 57 to an arm 58 pivotally mounted on top of a switch casing 59 which may be attached to one of the housings 22. At that end of the lever 58 which projects into the casing 59, a transverse bar 60 is secured, this bar being covered on its inner surface with a layer of insulating material and adapted to force upon actuation of the lever 58, preferably resilient, switch arms 61, 62, 63, 64 into circuit closing relation with respect to associated individual contacts.

It will be seen, therefore, that upon actuation of the clutch pedal 31, prior to the actuation of the yokes 29 (delayed owing to the lost motion connection 35), the four-arm switch 61, 62, 63 and 64 will be closed.

The switch arm 61 is connected through conductor 65 with a ring 66 inserted into a sleeve 67 of insulating material and adapted to be shifted axially on a shaft 68 on which a governor 69 is mounted. The insulating sleeve 67 which rotates with the shaft 68 and is axially displaced thereon upon a variation in the speed of the shaft 68, as will be well understood, is slidable in another stationary insulating sleeve 70 which has in its interior a plurality of axially spaced metallic contacts 71, 72, and 73.

The governor shaft 68 is driven through a bevel gearing 74, and 75 from the driven shaft 5. Upon the displacement of the governor sleeve 67 the contact ring 66 will, therefore, successively establish conductive relation with the rings 71, 72 and 73 which are connected with the yieldingly locking switches provided to cooperate with the shift rods 15 and 16 to make or break contact.

These locking switch operating members are shown in detail in Fig. 12, each locking member being associated with a switch. The casings 23 guiding the shift bars are provided with a plurality of cups 76 preferably made of insulating material and each containing a slidable pin 77 controlled by a spring 78, to yieldingly urge the tip of the pin 77 into contact with the pertaining shift rod through an opening in the casing 23. The pins 77 are provided adjacent the ends projecting from their cups with metallic portions 79 between two insulated portions 80. Each cup also carries on the outside two pairs of springs 81 and 82 respectively, and so arranged, that upon the pin 77 being in projected position, Fig. 12, the springs 81 are insulated from each other and the springs 82 are conductively connected through the metallic part 79, while in the withdrawn position of the pin the other springs 81 are conductively connected and the springs 82 are insulated from each other. A projection of the pins 77 can occur only when a notch on the pertaining shift bar has arrived in registry therewith.

Assuming now, by reference to Fig. 13, that the driver desires to start the vehicle, he will first close the master switch 46, i. e., connecting contacts 50, 51, depress the clutch pedal, thereby closing through the tension member 57 the switches 61 to 64 inclusive, before actuation of the yokes 29 takes place due to the lost motion in member 35.

In the following description of the circuits the electromagnets 33, cam discs 25 and contacts 81, 82 are provided with lateral indices to facilitate the tracing of the circuits.

The closure of these switches will then establish the following circuit: from the grounded battery 45 to the contacts 51, 50, switch arm 61, conductor 65, metallic ring 66, contact ring 71, contacts $82^a$, contacts $82^f$, to the magnet $33^k$ which is grounded. This electromagnet, therefore, will be energized and the pertaining pawl will be moved to operative position.

Continued depression of the clutch pedal will then lead to a mechanical transmission of this movement to the rocking yokes 29 mounted in both housings 22, and the cam disc will be rotated to advance the shift bar 16 a suitable distance, bringing gear 10 into engagement with the gear 13, on the rotating countershaft 6. The transmission is then in low gear.

The shift bar 16 having been actuated will force the locking element $77^g$ out of the innermost notch 83 of said bar, while the locking element $77^f$ which heretofore had been in inoperative position will thereby enter the second notch 84 to again hold the shift bar 16 yieldingly locked in its new position.

Upon release of the clutch pedal, the current will be interrupted at the switch arms 61, 62, 63 and 64, whereby the magnets $33^k$ will be deenergized, and the pawl pertaining to said magnets will return automatically to inoperative position, while the rocking yokes 29 are returned to initial position thru the link and lever connection described.

If the car gains in speed and the operator desires to move the change speed gear to a high or low position, he again depresses the clutch pedal 31, thereby closing he switch arms 61, 62, 63 and 64. Owing to the increase in the speed of the vehicle and the resulting displacement of the governor sleeve 67, the annular contact 66 has now been moved into engagement with the ring 72, and the current will now be continued from switch arm 61, contacts 66 and 72 to contact springs $81^f$ of the locking element $77^f$ which is now in projected position. In this manner the electromagnet $33^h$ is energized, which is the central magnet of the right hand set.

The disc 90 pertaining to this central magnet $33^h$ of the right hand set, Fig. 13, is of special construction, Figs. 4 and 5. It is not mounted directly upon the shaft 21, but is loose on a sleeve 91 which is keyed to the shaft 21. This sleeve passes through bores in arms 92 of a bracket, secured to the rear wall of the housing 22. The arms 92 are provided with cam edges 93 and 94 for co-operation with slidably disposed keys 95 and 96 in the disc 90. The keys 95 and 96 having lateral projections 99 extending over the edge of the cam edges 93 and 94 are yieldingly urged into key-ways 98 in the sleeve 91 by spring 97.

Therefore, if subsequent to the movement of the contact 66 in engagement with the contact 72, the clutch pedal 31 is actuated, and the yoke 29 carrying the electromagnet $33^h$ is rocked, the pawl 27 pertaining to said magnet $33^h$ will rotate the disc 90 and thereby the sleeve 91 keyed to the shaft 21. As this rotation is opposite to that which was induced by energization of magnet $33^k$, the bar 16 will be shifted back, the gear 10 will again go to neutral position, the locking pin $77^g$ will snap into notch 83 again.

During this same depression of the clutch pedal 31 with the locking pin $77^g$ in its operative position, the latter completes a circuit through the contacts $81^g$ to the electromagnet $33^e$ whereby through actuation of the clutch pedal, the yoke in the other or left hand box 21 causes the shaft 21, to be rocked sufficiently to shift the gear 9, through the bar 15, rearwardly into engagement with the gear 12, or in other words, into second speed.

The locking pin $77^c$ has now entered the notch 85 of the shift bar 15, and the pin $77^a$ is in engagement with the notch 87 of the same bar, whereby the contacts $81^c$ and $81^a$ respectively are bridged to complete the circuit.

Now when the car continues to gain in speed, the governor 69 will cause the contact ring 66 to engage the lowermost contact 73 in the stationary sleeve 70, and upon renewed depression of the clutch pedal 31 the following circuit is established: from the grounded battery 45 through contacts 51 and 50, switch arm 61, contacts 66, 73 and contacts $81^c$ leading to the grounded electromagnet $33^b$. The actuation of the yokes 29 will now cause the pawl associated with the electromagnet $33^b$ to shift the rod 15 forward, Fig. 13, advancing the gear 9 through neutral position into clutch engagement with the engine shaft 4, so that the driven shaft 5 rotates at the speed of the engine shaft. This is the high speed of the transmission and the speed at which the vehicle usually travels. The location of the shoulder 26 on the disc 25 pertaining to the electromagnet $33^b$ obviously must be such that upon rocking the yokes 29, the gear sector 20 is also rotated sufficiently to advance the bar 15 out of second speed position through neutral position into third speed. In this position of the shift bar 15 the locking pin $77^b$ has entered the notch 86, closing the contacts $81^b$ while the locking pin $77^a$ rests in the end notch 89, closing the contacts $81^a$. The shift rod 16 has not been actuated, and its locking pins have remained in their neutral position, as indicated in Figure 13.

If, owing to the application of the brakes or increase of the load by traveling up hill or the like, the speed of the vehicle is reduced, another actuation of the clutch pedal 31 will again automatically vary the relation of the change speed gear for second speed, since at that time, owing to the operation of the governor 69, the sleeve contact 66 again is moved into engagement with the contact ring 72. The circuit established by depressing the clutch pedal goes from battery 45, contacts 51 and 50, through switch arm 61, contacts 66, 72 and $81^b$ into the electromagnet $33^d$ whereby continued depression of the clutch pedal will cause a return movement of the shift rod 15 and of the gear 9 to the neutral position shown. At the same time, however, a circuit also is closed through the above described contacts 51, 50, 66, 72 and through the bridged contacts $81^g$ into the electromagnet $33^e$ arranged on the same yoke as the electromagnet $33^d$, and therefor actuating the pertaining shaft 21 in the same direction. Hence the movement induced by the electromagnet $33^d$ and the pawl and yoke of the same is amplified to shift the rod 15 and gear 9 from the neutral position just referred to to second speed position, in which position the gear 9 is in engagement with the gear 12. The end pin $77^a$ associated with the shift rod 15 then snaps into the notch 87 closing the contacts $81^a$, while the previously closed contacts $81^b$ are opened.

Upon further decrease of speed from the second rate of speed, the governor 69 will again shift the contact ring 66 into engagement with the stationary sleeve contact 71, and upon depression of the clutch pedal the following circuit is immediately established: from the grounded battery 45 through the contacts 51 and 50, switch arm 61, contacts 66 and 71, contact $81^a$, through the electromagnet $33^a$ and the electromagnet $33^c$ connected in multiple therewith. The differential action of these two electromagnets $33^a$ and $33^c$ will then cause the shift rod 15 to be moved forward into the position in which the gears are shown in Fig. 13, the gear 9 becoming inoperative since it is then separated from the clutch on shaft 4 as well as from the gear 12 on the countershaft. There is also closed, immediately after this movement of the shift rod 15 to neutral position, that set of contacts $82^a$ which is controlled by the pin $77^a$ which now assumes the position shown in Fig. 13. This branch of the circuit is continued through the contacts $82^a$, contacts $82^f$, to the electromagnet $33^k$ with the result that the shaft 21 pertaining to the shift rod 16 is rocked upon actuation of the yokes, thereby causing the shift bar 16 to be moved forwardly, Figure 13, bringing the gear 10 into engagement with the gear 13 which is the lowest speed obtainable. The shift rod 15 is then in the position illustrated in the drawing, while on the shift bar 16 the pin $77^f$ has entered the notch 84, closing the contacts $81^f$.

If it is now desired to return the gears to neutral position, as shown in the drawing, it is only necessary to move the master switch 46 into a position in which the contacts 48 and 49 are closed, as shown in the drawing, and to depress the clutch pedal for establishing the circuit as follows: from the grounded battery through contacts 49 and 48, switch arm 62, contacts $82^g$ and electromagnet $33^f$, for causing a rocking movement of the shaft 21 in a direction opposite to that previously produced, and thereby returning the gear 10 also to neutral position and the shift rod 16 likewise into the position illustrated in the drawing.

The pedal controlled movement of the gears from neutral position to reverse may be effected by displacing the reverse master switch 47 from the position shown in the drawing to a position in which the contacts 55 and 56 are bridged, while of course the master switch 46 is pushed into connect contacts 48 and 49. The subsequent depression of the clutch pedal will establish the following circuit: from the grounded battery 45 through contacts 49 and 48, contacts 56 and 55, switch arm 63, contacts $82^d$, to electromagnet $33^g$. Upon actuation of the yokes by the clutch, the right hand shaft 21 will be rocked inwardly in a direction in which the shift arm 18 on the rod 16 causes the gear 11 to enter reverse position through idler $14^a$ and the gear 14. The position of the shift rod 15 remaining unaltered, the shift rod 16 will now be yieldingly locked in the new position owing to the entry of the pin $77^d$ into the notch 88 closing contacts $81^d$.

If it is desired to return the gears from this reverse position to neutral position, the reverse master switch 47 is moved to neutral position, as illustrated in the drawing, and the subsequent depression of the clutch pedal closes the following circuit: from the battery 45 thru contacts 49 and 48, contacts 54 and 53, and switch arm 64, closed contacts $81^d$ to the electromagnet $33^i$. The actuation of the yokes will now rock this shaft 21 back to its former position, also inducing the movement of the gear 11 forward to the position illustrated in Fig. 13, the shift rod 16 then assuming the position which is shown in the drawing.

It is obvious, therefore, that the illustrated change speed gear transmission is operating semi-automatically inasmuch as the governor 69 controlled by the driven shaft initiates the positioning of certain circuit closing elements, putting them into readiness for permitting the establishment of various circuits through the subsequent depression of the clutch pedals, this variation in the circuits being effected in a predetermined proper sequence to gradually increase or decrease the rate of transmission.

From Figure 1 it is also apparent that the ordinary gear shift lever 100 may remain in association with the entire transmission, so that any substantial alteration in the change speed gears of known construction is not necessary, but may be used in conjunction with the device if desired, or the gear shift handle may be detachable and carried like a starting crank for emergency use. It is, furthermore, obvious that the operator may effect the change of speed through this gear shift lever 100 in the ordinary way, and entirely independently of the speed of the vehicle.

With the car wired as shown in Figure 13 and the switches as shown in Figure 12, when desiring to stop while in high gear the brake is applied, then as the car is about to stop the clutch is released and when the car comes to a full stop the governor brings the gear to neutral.

The fragmental wiring diagram shown in Figure 14, and the switch shown in Figure 15 are provided to enable the bringing of the car from high to neutral without waiting for the car to come to a full stop.

It is to be here noted that when this result is to be accomplished, namely the bringing of the gearing to neutral from high without coming to a full stop, that switches as shown in Figure 15 are used at $77^c$ and $77^b$ and by the change in wiring as shown in Figure 14. Then when switch $77^c$ is in engagement with a notch both circuits $81^c$ and $82^c$ are connected and when switch $77^b$ is in engagement with the notch, both circuits $81^b$ and $82^b$ are connected. Therefore, to bring the car to neutral from third before coming to a full stop, switch 46 must be pushed in and the clutch released.

While heretofore electrical change speed gear devices were known in which the change from one speed to another was selectively effected by a pressure upon a certain predetermined button or the like of a series, it will be seen that in the present change speed gear the operator does not have to determine which button is to be pushed, but that a uniformly single actuating member, namely the clutch pedal upon being operated varies the position of the gears in accordance with the speed of the vehicle. The ordinary gear shift is associated with a lever, the manipulation of which requires practice on the part of the operator, and also the push button change speed gear controls require considerable practice before they can be operated with safety. The present change speed gear device does not call for any experience on the part of the operator, and as the driver instinctively depresses the clutch pedal, the change from higher to lower gear is effected whenever this is required. A change from any speed to another speed is effected here in the proper sequence, and a change from a lower to higher speed where the inverse change is necessary cannot take place.

It is, furthermore, obvious that in this device none of the gears passes from one speed to another without an intermediate neutral condition, and hence the danger of stripping the gears which may take place in the ordinary gear shift is entirely avoided. The device will operate with the ordinary battery which is installed on all power vehicles, and the strain imposed on the battery by this device is a very small one, partly because the battery is called on, intermittently only, to supply current for the electric change speed gear, and partly because the current required for energizing the electromagnets does not have to be of great intensity. The electromagnets have the function solely of placing their armatures to operative position, while the pawls are operated by means of the yokes for effecting a displacement of the gear shift rods. It is also obvious, that in this device, the weather conditions will not detrimentally affect the operation of the device, so that even in severe cold weather the shifting of the gears from any desired position can be effected in accordance with the speed of the vehicle.

I claim:

1. In a change speed gear transmission of the type in which two shift rods are individually associated with sets of shiftable gears, a gear sector pertaining to each shift rod and in permanent engagement with the same, a carrier for each gear sector, a plurality of cam discs supported by each of said carriers, an operator controlled elements, means actuated by said operator controlled element for imparting a rotary movement to said carrier under coaction with said cam discs, and speed controlled means for determining the cam disc to be actuated.

2. In a change speed gear transmission of the type in which a pair of gear shift rods are associated with sets of shiftable gears, sectors in engagement with said shift rods, shafts on which said sectors are mounted, cam discs secured to said shafts, an operator controlled actuating element for said cam discs normally operatively disconnected from said discs, and means dependent upon the speed of a member of the transmission for effecting operative connection of said last named operator controlled element with one of said cam discs.

3. In a change speed gear transmission of the type in which shift rods are individually associated with slidable sets of gears. rotary means for imparting movements in either direction longitudinally to said shift rods, sets of cam discs, each set associated with said rotary means, operating elements for said cam discs normally disconnected from the same, and an operator controlled element for operatively connecting said operating means with said cam discs and for effecting rotary movement of said cam discs.

4. In a change speed gear transmission of the type in which sets of shiftable gears are associated with a governor, a plurality of rotary cam discs associated with each of said sets of gears, electromagnets each associated with a cam disc, a switch in the circuits of said electromagnets, means associated with the governor for determining the circuit to be used, means for imparting partial rotation to said cam discs, and a clutch pedal connected with said switch and said cam disc operating means.

5. In a change speed gear transmission of the type in which sets of shiftable gears are associated with a speed governor, including rotary means for shifting said gears, mechanism for imparting a rotary movement to said means, electromagnets for rendering said mechanism operative, the selection of said electromagnets being determined in accordance with the position of the governor, a master switch, a clutch pedal, a switch actuated by said clutch pedal for completing the circuit thru the electromagnet determined in accordance with the position of the governor, and operative connections between said clutch pedal and said rotary means for actuating the rotary means which have become operative through energization of the pertaining electromagnet.

6. A change speed gear transmission of the type in which a pair of shifting rods is associated with sets of slidable gears for driving a shaft in operative connection with a speed governor, including rotary means normally inoperative for imparting longitudinal movement to said shifting rods, means determined by the position of the governor for rendering said rotary means operative, said last named means being electrically controlled, locking members for yieldingly retaining said shift rods in their adjusted position, a clutch pedal, a switch controlled by said clutch pedal for supplying circuit to the electric means determined by said governor, said circuit also being under control of the locking members for said shift rods, and means under control of the operator actuated element for manipulating the rotary means rendered operative by said electric means.

7. A change speed gear comprising shiftable gears, a clutch pedal, shift rods associated with the gears, a pair of shafts operatively connected with the shift rods, cam discs secured on the shafts, pawls adapted to act on the cam discs, electromagnets controlling the pawls, yokes for the electromagnets, a speed governor, a source of current, circuit connections between said source of current and the electromagnets, a clutch pedal, a switch controlled by the clutch pedal for closing the circuits through the electromagnets in dependence upon the position of the governor, the yokes on which the electromagnets are mounted being controlled by the clutch pedal, and a plurality of locking members for the shift rods, the circuit connections closed upon actuation of the clutch pedal being also determined by the position of the locking members relatively to the shift rods.

8. A change speed gear comprising shiftable gears, shift rods associated with the gears, shift rod actuating means, electromagnets controlling said means, yokes for the electromagnets, a source of current, circuit connections extending from the source of current to the electromagnets, a switch controlled by the clutch pedal for closing the circuit connections through the electromagnets, means determined in their position in accordance with the speed of the vehicle for varying said circuit connections, the yokes for shift rod actuating means being controlled by the clutch pedal, and locking members for the shift rods, the circuit connections to the electromagnets being also determined by the position of the locking members relatively to their rods.

9. A change speed gear transmission having a plurality of shiftable gears in combination with a clutch pedal, a first link connected with said clutch pedal and having lost motion in the connection; a second link connected with said pedal without lost motion, operative selective means operable by said first link for shifting said shiftable gears, electrical means controlling said selective means, and switch mechanism for said electrical means operable by said second mentioned link.

10. A change speed gear transmission having a plurality of shiftable gears in combination with a clutch pedal, a first link connected with said clutch pedal and having lost motion in the connection; a second link connected with said pedal without lost motion, operative selective means operable by said first link for shifting said shiftable gears, electrical means controlling said selective means, switch mechanism for said electrical means operable by said second mentioned link; and speed controlled means also controlling said electrical means.

11. In a change speed gear transmission of the type in which sets of shiftable gears are associated with a speed governor, including a pair of shift rods operatively associated with a rotary means for shifting said gears, electromagnets for rendering said rotary means operable, a switch actuated by said clutch pedal for completing the circuit through the electromagnet determined in accordance with the position of the governor, a plurality of auxiliary switches actuated by the shift rods, said circuit also being under control of said auxiliary switches, and operative connections between said clutch pedal and said rotary means for actuating the rotary means which have become operative through energization of the pertaining electromagnet.

In testimony whereof I affix my signature at 10 South LaSalle Street, Chicago, Illinois.

HARRY L. HOY.